(12) United States Patent
Leclercq

(10) Patent No.: US 7,362,188 B2
(45) Date of Patent: Apr. 22, 2008

(54) SYSTEM-ON-A-CHIP (SOC) CLOCK MANAGEMENT—A SCALABLE CLOCK DISTRIBUTION APPROACH

(75) Inventor: Maxime Leclercq, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 552 days.

(21) Appl. No.: 10/453,982

(22) Filed: Jun. 4, 2003

(65) Prior Publication Data
US 2004/0248624 A1    Dec. 9, 2004

(51) Int. Cl.
*H03B 25/00* (2006.01)
(52) U.S. Cl. .................... 331/60; 455/573; 331/46
(58) Field of Classification Search ........... 455/573; 331/46, 60; 713/500, 501
See application file for complete search history.

(56) References Cited

U.S. PATENT DOCUMENTS 5,289,138 A * 2/1994 Wang ..................... 331/49
6,092,210 A * 7/2000 Larky et al. ............. 713/400
6,614,320 B1 * 9/2003 Sullam et al. ............ 331/46
6,839,391 B2 * 1/2005 Novak et al. ............ 375/354

* cited by examiner

*Primary Examiner*—Rafael Perez-Gutierrez
*Assistant Examiner*—My X Nguyen
(74) *Attorney, Agent, or Firm*—Steven A. Shaw; W. James Brady; Frederick J. Telecky, Jr.

(57) ABSTRACT

System and method for providing clocks to digital circuitry with a need for multiple clocks. A preferred embodiment comprises an oscillator controller (oscillator clock domain block 305) distributes a system clock generated by an oscillator to a plurality of clock domain blocks (GSM clock domain block 310 and so forth). The clock domain blocks use the system clock to generate specific clocks needed by attached hardware. The clock domain blocks may be programmed after manufacture to permit customized clock generation to meet requirements.

5 Claims, 8 Drawing Sheets

SYSTEM-ON-A-CHIP (SOC) CLOCK MANAGEMENT—A SCALABLE CLOCK DISTRIBUTION APPROACH

TECHNICAL FIELD

The present invention relates generally to digital circuitry, and more particularly to a system and method for providing clocks to digital circuitry with a need for multiple clocks.

BACKGROUND

In many of today's high technology applications, a complete system can be placed onto a single piece of silicon. The system on a chip (SoC) may include all of the needed electronic circuits and parts for a complete system onto a single integrated circuit (IC). For example, a SoC implementation of a cellular telephone may include a radio frequency transceiver, an analog-to-digital converter (ADC), a digital-to-analog converter (DAC), a microprocessor, memory, audio input/output circuitry, display circuitry, battery management circuitry, peripheral interface circuitry, a clock distribution system, and so forth.

In a 3rd generation (3G) cellular telephone, such as one compliant to the Universal Mobile Telephony System (UMTS) technical standard, the cellular telephone feature the ability to operate in multiple different technical standards and have the ability to connect to other electronic devices via wired and wireless technology. For example, an UMTS cellular telephone also features the ability to communicate using global system for mobile communication (GSM) and wideband code-division multiple access (WCDMA), both of which have different requirements. Furthermore, the UMTS cellular telephone may feature communications interfaces, such as universal serial bus (USB), variants of IEEE 802.11, and Bluetooth, to allow it to connect to computers and other electronic devices. These features are often called connectivity applications.

Each of these applications, since most of them operate at different clock frequencies, will require a different clock in order to operate. Therefore, the SoC implementation of the UMTS cellular telephone may require a clock generator for each of the applications. When combined with time-to-market and cost constraints, many clock generation solutions for a SoC tends towards a operable solution, i.e., a clock generation solution that provides the many different clocks needed.

One easily implemented solution is to use a separate clock generation circuit for each application that needs a different clock. Since in many cases, the designers would already have an existing design for each of the needed clocks, this solution would simply combine all of the needed clocks onto the integrated circuit.

One disadvantage of the prior art is that the use of an unoptimized clock generation circuit can lead to a clock generation circuit that in needlessly complex and may require the use of multiple clock trees that need to be managed concurrently. This can result in a large and cumbersome clock generation circuit that consumes more space on the integrated circuit than needed.

A second disadvantage of the prior art is that the use of an unoptimized clock generation circuit is that the clock generation circuit may not efficiently power-down when the system is powered down. This can result in greater power consumption than necessary and hurting battery life if the system is a wireless device.

SUMMARY OF THE INVENTION

These and other problems are generally solved or circumvented, and technical advantages are generally achieved, by preferred embodiments of the present invention which provides a system and method for generating multiple clocks for an electronic system that may be integrated onto an integrated circuit.

In accordance with a preferred embodiment of the present invention, a method for clock management comprising determining a need for a clock signal, enabling a clock generator for the clock signal, wherein the clock generator is programmed to generate the clock signal, and using the clock generator to generate the clock signal.

In accordance with another preferred embodiment of the present invention, a clock management system comprising an oscillator controller coupled to an oscillator, the oscillator controller containing circuitry to enable the operation of clock domain blocks coupled to the oscillator controller and to distribute a clock signal generated by the oscillator, and a plurality of clock domain blocks coupled to the oscillator controller, each clock domain controller containing circuitry to generate a clock signal as specified in a configuration of the clock domain controller based on a clock signal provided by the oscillator controller.

In accordance with another preferred embodiment of the present invention, a mobile telephone comprising an analog processing hardware block coupled to an radio frequency (RF) transceiver, the analog processing hardware block containing circuitry to amplify, filter, and gain control a signal provided by the RF transceiver, a digital processing hardware block coupled to the analog processing hardware block, the digital processing hardware block containing circuitry to error detect and correct, filter, and decode a signal provided by the analog processing hardware block, a processor coupled to the digital processing block, the processor to execute programs to manipulate data provided by the digital processing hardware block, an applications hardware unit coupled to the processor, the applications hardware unit containing circuitry to support different communications protocols supported by the mobile telephone, a peripherals interface coupled to the processor, the peripheral interface containing circuitry to translate signals and protocols to allow the mobile telephone to communicate with attached devices, and a clock hardware unit coupled to the processor, applications hardware unit, and peripherals interface, the clock hardware unit to provide clocks of differing frequencies and formats.

An advantage of a preferred embodiment of the present invention is that it permits the quick addition of optimized clock generators so that integrated circuit space and power consumption can be minimized with a minimum design effort and maximizing re-use.

A further advantage of a preferred embodiment of the present invention is that clock sleep and wakeup is performed in hardware, so that processor and device sleep time can be maximized since overhead associated with sleeping and waking up is minimized (hardware sleep and wakeup functions typically will have less overhead than software sleep and wakeup functions). Hence, power consumption can be further minimized.

Yet another advantage of a preferred embodiment of the present invention is generic clock generator can be integrated onto the integrated circuit, allowing the addition of new clocks in the future.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a SoC implementation of a mobile telephone compliant to the UMTS (Universal Mobile Telecommunications System) technical standard. An overview of the UMTS technical standard is provided in a document entitled "$3^{rd}$ Generation Partnership Project; Technical Specifications Group Services and System Aspects General UMTS Architecture (Release 4)," which is herein incorporated by reference. The invention may also be applied, however, to other mobile telephones compliant to other technical standards, as well as integrated circuit applications wherein an efficient, flexible, and scalable clock generation circuit is needed.

Figure 1:
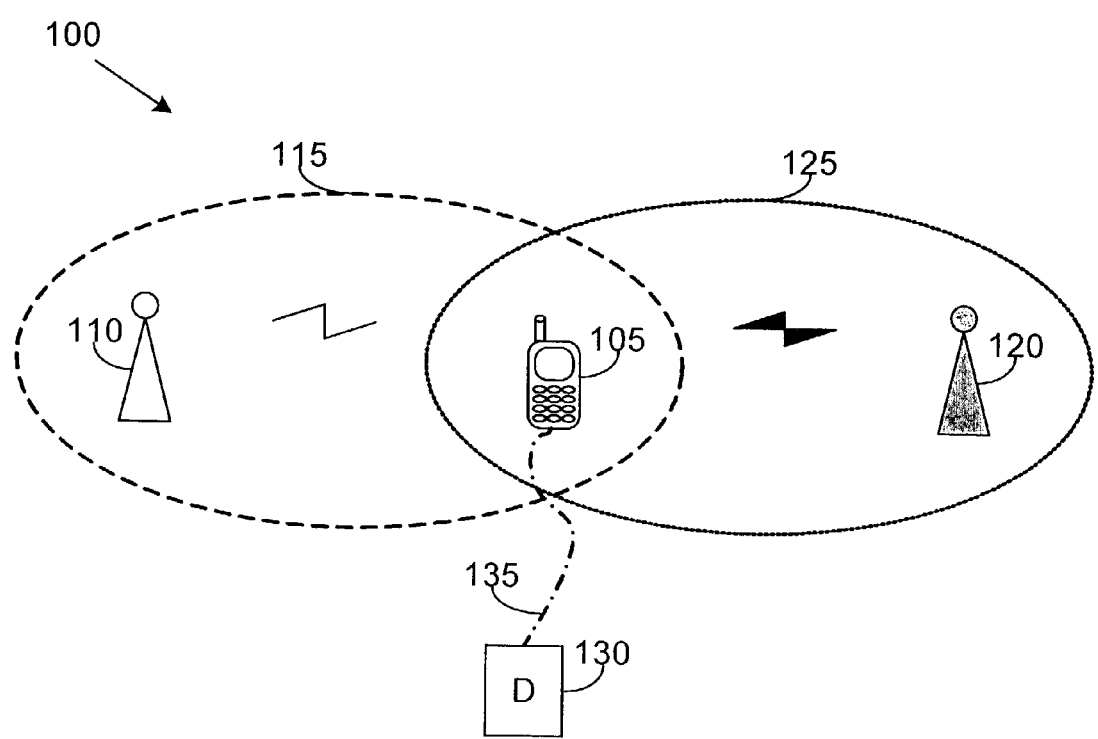
FIG. 1 is a diagram of an exemplary usage scenario for a mobile telephone.

With reference now to FIG. 1, there is shown a diagram illustrating an exemplary usage scenario 100 for a mobile telephone 105. The mobile telephone 105 is shown communicating with two different base stations 110 and 120, wherein the two base stations may be a part of different wireless communications networks using possibly different communications technologies. The mobile telephone 105, when within an effective coverage area of either of the two base stations 110 (coverage area 110) and 120 (coverage area 125), can become linked with the respective base station and hence a part of the wireless communications network. Note that although the base stations 110 and 120 are displayed as being in relatively close proximity, it may be possible that the base stations 110 and 120 are widely separated, perhaps cities (or states, countries, or continents) apart. It is the intent of FIG. 1 to display that the mobile telephone 105 may be capable of communicating with either base station 110 and/or 120 when it is in the base station's coverage area.

In addition to being able to communicate in a plurality of different wireless communications networks, the mobile telephone 105 may be able to connect to one or more of many different types of devices 130 via a connection 135. Note that while displayed as a wired connection, the connection 135 may be either a wired or a wireless connection. For example, the connection 135 may be wired, such as an universal serial bus (USB) connection, a Firewire connection, a serial port, a parallel port, a proprietary connection, and so forth or it may be wireless, such as a Bluetooth connection, a variant of IEEE 802.11 connection, an infrared connection, a light (or laser) emitting diode connection, and so on. The connection 135 may be thought of as providing short-range connectivity to the device 130. Examples of devices may include but not limited to computers, personal digital assistants, audio/video/multimedia appliances, telemetry equipment, and so on.

As integrated circuit fabrication technology has advanced, it has become possible to place an entire electronic system, such as a mobile telephone, onto a single integrated circuit (IC). This is commonly referred to as system-on-a-chip (SoC). The SoC may include all of the needed electronic circuits and parts for a complete system onto a single IC.

Figure 2:
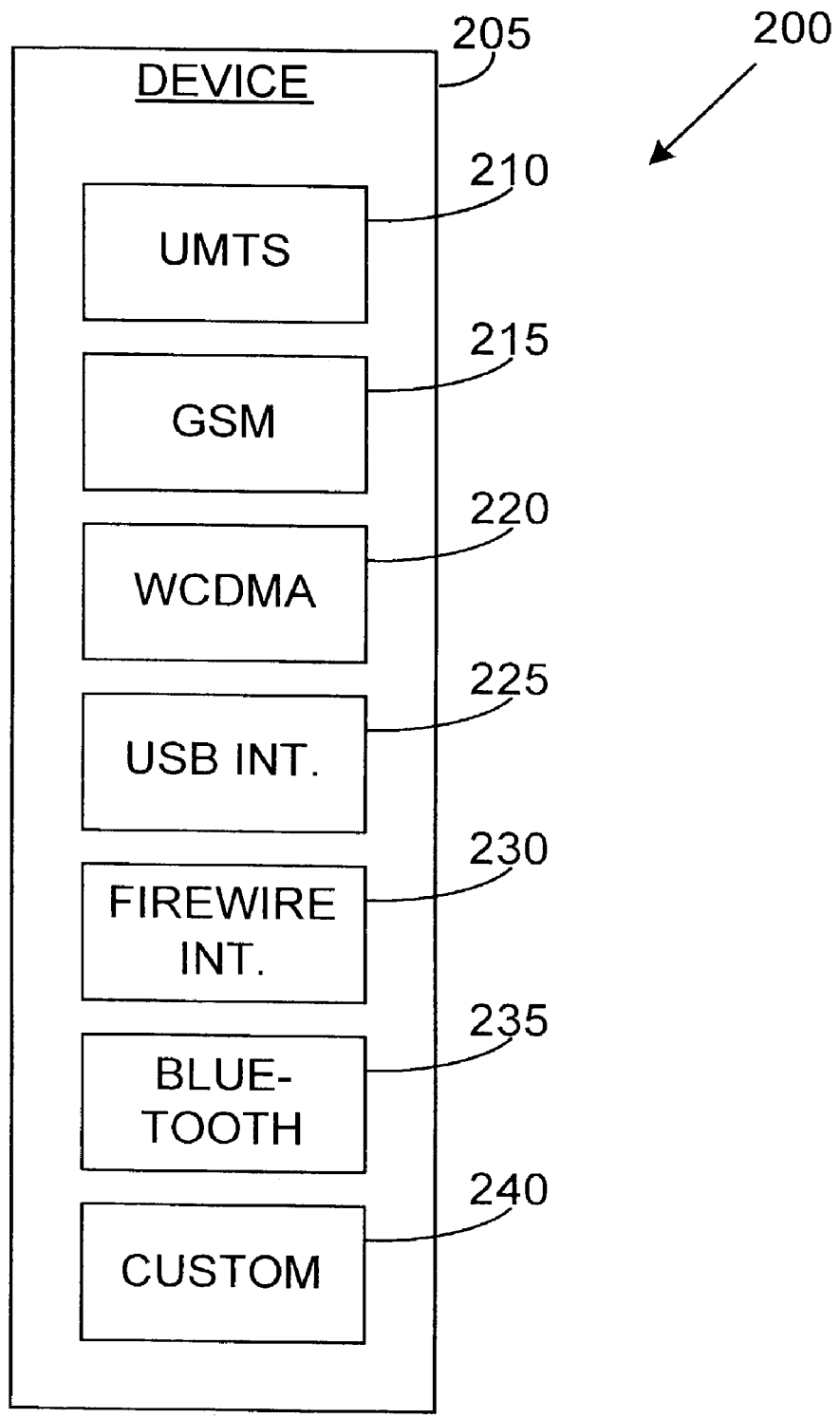
FIG. 2 is a diagram of an exemplary mobile telephone which has been integrated onto a single integrated circuit.

With reference now to FIG. 2, there is shown an exemplary mobile telephone 200 which has been integrated onto a single IC 205. The figure provides a high level view of the mobile telephone 200 and multiple applications within the mobile telephone 200. For example, the mobile telephone 200 may be an UMTS compliant wireless device (as shown by an UMTS application 210). An application may be a combination of hardware and software needed to support a particular function.

However, the mobile telephone 200 may also be capable of operating in a GSM or WCDMA environment (applications 215 and 220). In addition to being capable of operating in different communications networks, the mobile telephone 200 can communicate with other devices via an USB interface (application 225), a Firewire interface (application 230), and a Bluetooth interface (application 235). To further enhance the flexibility of the mobile telephone 200, the mobile telephone 200 may include one (or more) custom applications 240 that may not be determined at the time of integration, but can be programmed at a later date. For example, the owner of the mobile telephone 200 may desire the ability to operate in standard CDMA (IS-95) communications networks. The owner may be able to purchase this and other different capabilities and applications from the service provider. Alternatively, the service provider may add certain features to the mobile telephone 200 as part of a value added package.

Many of the different applications supported by the mobile telephone 200 require clocks of differing frequencies. For example, USB uses a 48 MHz clock, while GSM uses a 13 MHz clock, and WCDMA a 15.36 MHz clock. Therefore, a solution using a single clock generating circuit would likely require a significant amount of design work and optimization to provide good performance. Unfortunately, with time and cost constraints, the clock generation circuit may not receive the optimization it requires. Additionally, the capability of supporting applications not implemented during integration would likely prohibit performance optimization for these custom applications and their clocks.

Figure 3:
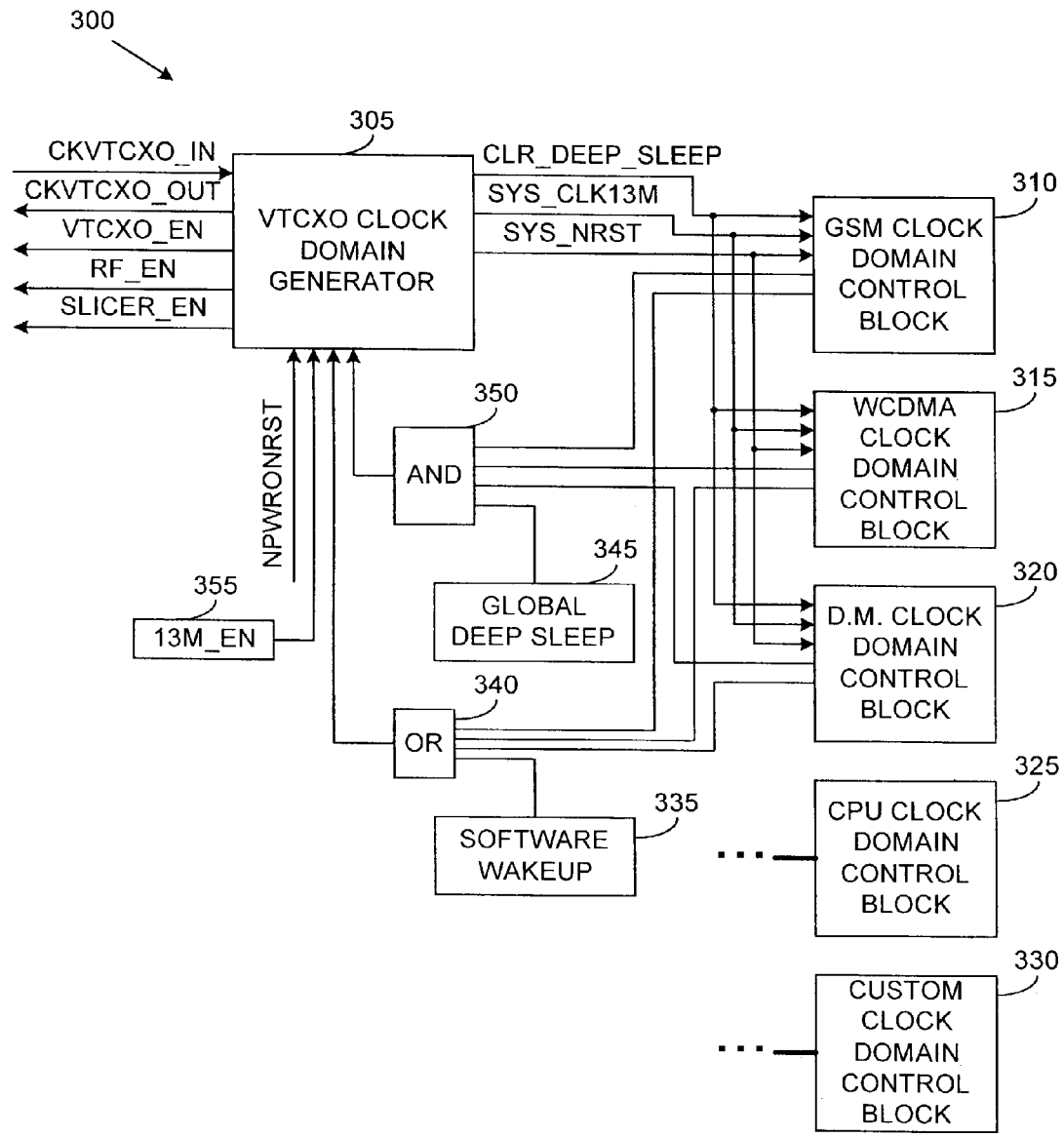
FIG. 3 is a diagram of a clock generation system for a mobile telephone, according to a preferred embodiment of the present invention.

With reference now to FIG. 3, there is shown a clock generation system 300 for a mobile telephone, according to a preferred embodiment of the present invention. Note that although the clock generation system 300 is designed for use in a mobile telephone, it is flexible enough to be used in a wide variety of integrated systems which have a need for multiple clocks. Since the figure illustrates a clock generation system for use in a mobile telephone, the terms used will be focused on a mobile telephone. However, the use of mobile telephony terms should not be construed as limiting the possible uses for the present invention.

Central to the clock generation system 300 is a VTCXO (voltage/temperature controlled crystal oscillator) clock domain generator (VCDG) 305. According to a preferred embodiment of the present invention, the VCDG 305 can be a dedicated state machine (a finite state machine) that can be enabled during a power-on sequence of the mobile telephone and used to control each of a plurality of individual clock domain blocks (such as a GSM clock domain block 310, a WCDMA clock domain block 315, a dual mode (D.M.) clock domain block 320, i.e., one for each of the applications in the mobile telephone). Clock domain blocks, sometimes referred to as system ultra-low-power devices, manage a system clock provided by the VCDG 305 (for example, a 13 MHz clock) and distributes it to attached peripherals and/or modules. Note that several clock domain blocks in FIG. 3 (namely a CPU clock domain block 325 and custom clock domain block 330) are displayed as not being connected to the VCDG 305). This is only to maintain simplicity in the figure. In an actual implementation, these clock domain blocks and others would be connected in a fashion that is consistent with the GSM clock domain block 310, the WCDMA clock domain block 315, and the dual mode clock domain block 320.

The VCDG 305 can be used to provide timing information as well as control signals to the individual clock domain blocks. According to a preferred embodiment of the present invention, to each one of the individual clock domain blocks, the VCDG 305 can be used to provide a system clock signal ("SYS_CLK13M"), a system reset signal ("SYS_NRST"), and a wakeup signal ("CLR_DEEP_SLEEP"). Additionally, the VCDG 305 may be responsible for controlling a VTCXO (not shown) to which it can be attached. The VTCXO may be used to provide a system reference clock usually tightly controlled and tuned during network operation. For example, a 13 MHz system clock. Furthermore, the VCDG 305 may control global enables for certain portions of the mobile telephone, such as a radio frequency (RF) portion, a data slicer portion, and the VCTXO itself. The VCDG 305 may also receive several input control signals, including a sleep signal, a wakeup signal, a reset signal, and an enable signal for the system reference clock.

From each of the individual clock domain blocks, several control signals may be provided to the VCDG 305. One such control signal may be a sleep signal that may be used to indicate that the clock domain block asserting such a signal is placing itself in sleep mode. An AND gate 350 can be used to combine the sleep signal from each of the clock domain blocks, along with a signal asserted by a global deep sleep block 345. If all clock domain blocks are asserting the sleep signal as well as the global deep sleep block 345, then the VCDG 305 may itself be placed in sleep mode. This assures that the VCDG 305 will not enter sleep mode unless all of the clock domain blocks dependent upon it are themselves in sleep mode and if the mobile telephone is also in sleep mode.

Another control signal that may be asserted by the clock domain blocks is a wakeup signal. The wakeup signal may be asserted by a clock domain block when it desires to wakeup from sleep mode. The mobile telephone may also assert a wakeup signal (via a software wakeup block 335). The wakeup signals from the clock domain blocks and the software wakeup block 335 may be combined via an OR gate 340 and provided to the VCDG 305, assuring that if one or more of the clock domain blocks (or the mobile telephone) is waking up, then the VCDG 305 will also be woken up.

Figure 4:
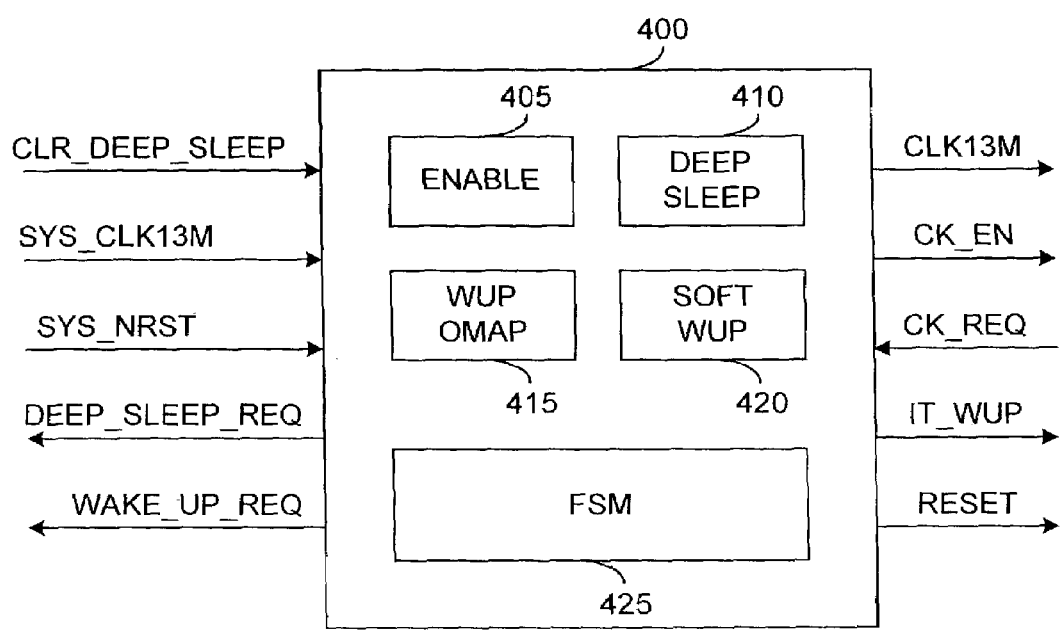
FIG. 4 is a diagram of a detailed view of a clock domain block, according to a preferred embodiment of the present invention.

With reference now to FIG. 4, there is shown a diagram illustrating a detailed view of a clock domain block, according to a preferred embodiment of the present invention. The clock domain block displayed in FIG. 4 may be a clock domain block that is capable of being programmed (customized) for operation for a specific application, such as the custom clock domain control block 330 displayed in FIG. 3. After being programmed for a specific application, such as GSM, the clock domain block 400 may appear like the GSM clock domain block 310 (FIG. 3).

According to a preferred embodiment of the present invention, the clock domain block 400 may include four specific memory locations (or registers). The information stored in the four specific memory locations may be used by a finite state machine 425 to control the operation of the clock domain block 400. Note that while being describe as specific memory locations, the four memory locations may be one or more bits in a single memory location and the bit (or group of bits) can be used to store the contents of the specific memory location. This means that a single memory location, for example, a 16-bit word may be used to store the contents intended for the four specific memory locations. According to a preferred embodiment of the present invention, the contents of each of the four specific memory locations can be stored in a single 16-bit word of memory, along with a current state of the clock domain block's finite state machine (which will be described below).

A first memory location, referred to as an enable 405, may be used as an asynchronous reset of the finite state machine of the clock domain block 400. For example, if the enable 405 is false (perhaps storing a binary zero (0)), then the finite state machine 425 can under go a reset, and if the enable 405 is true (perhaps storing a binary one (1)), then the finite state machine 425 can be enabled and ready for operation. A second memory location, referred to as a deep sleep 410, may be used generate a deep sleep request that is to be transmitted to the VCDG 305. For example, if the deep sleep 410 is false (binary zero (0)), then a deep sleep request will not be generated, and if the deep sleep 410 is true (binary one (1)), then a deep sleep request will be generated and transmitted.

A third memory location, referred to as a wakeup processor 415, may be used as a mask of an interrupt sent to the processor (not shown) after a clock request has been sent by circuitry attached to the clock domain block to the clock domain block. For example if the wakeup processor 415 is false, then the interrupt to the processor is generated, and if the wakeup processor 415 is true, then the interrupt to the processor is masked. A fourth memory location, referred to as a soft wakeup 420, may be used to store a wakeup request that is to be transmitted to the VCDG 305 in the form of a clock request. For example, if the soft wakeup 420 is false, then a soft wakeup is not generated, and if the soft wakeup is true, then a soft wakeup will be generated and transmitted.

Figure 5:
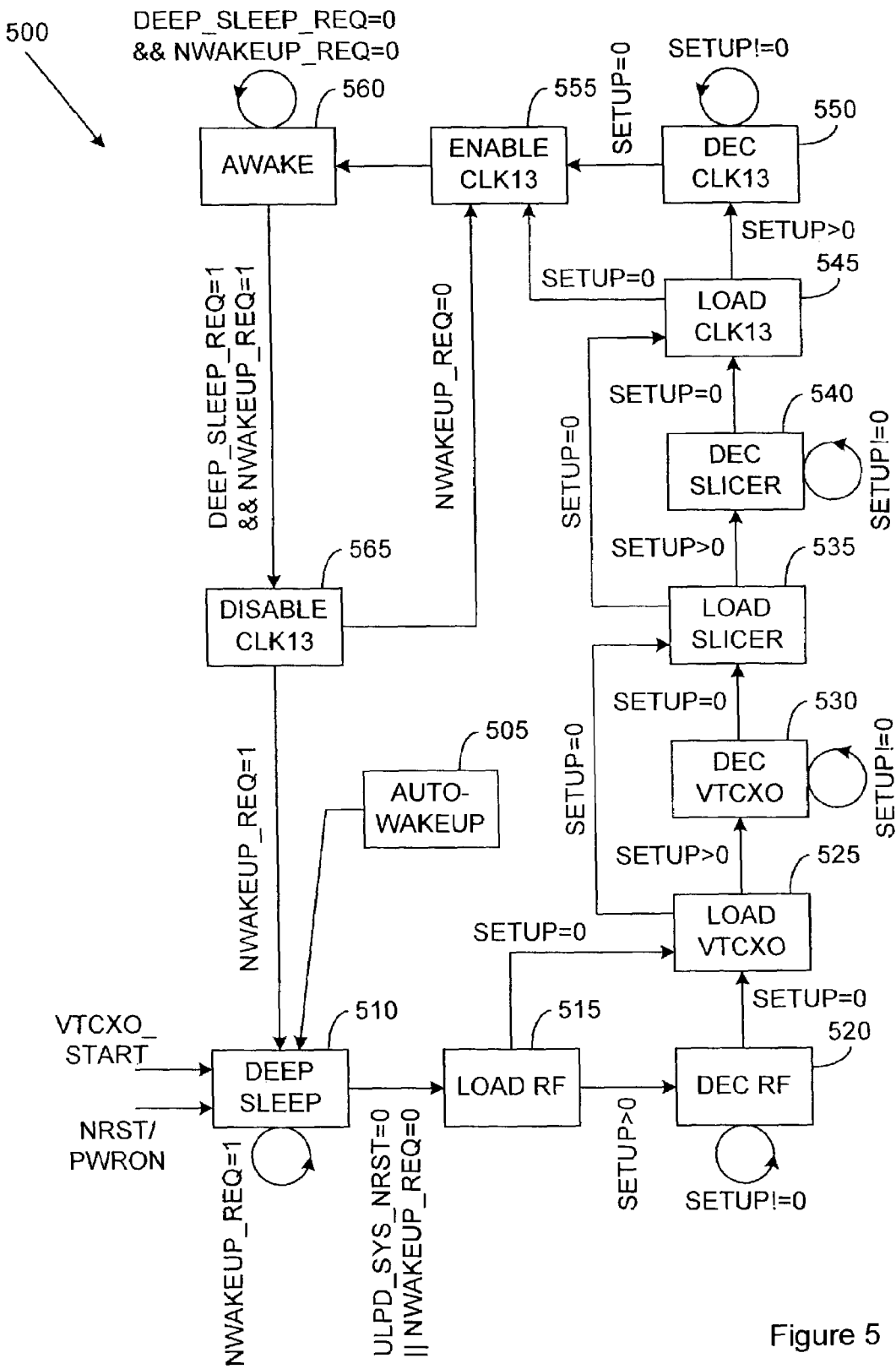
FIG. 5 is a state diagram of a finite state machine used to control the operation of a VCDG (VCTXO clock domain generator), according to a preferred embodiment of the present invention.

With reference now to FIG. 5, there is shown a diagram illustrating a state diagram 500 of a finite state machine used to control the operation of a VCDG (such as the VCDG 305 (FIG. 3)), according to a preferred embodiment of the present invention. Upon power-up or after a reset, the finite state machine (FSM) controlling the VCDG 305 is in state "Auto Wakeup" 505, where it can evaluate the status of auto wakeup. Note that the status check may be only evaluated once when the VCDG 305 is enabled. If auto wakeup is true, then the VCDG 305 may be able to automatically wakeup when it receives a signal.

After checking the status of auto wakeup, the FSM transitions to state "Deep Sleep" 510, where it remains as long as does not receive a wakeup request (NWAKEUP_REQ=1). When in "Deep Sleep" 510, the VCDG 305 and attached clock domain blocks may essentially be in a turned off (disabled) mode, wherein no clocks are being generated. However, deep sleep can be different from powered off mode in that wakeup from deep sleep can be more rapidly achieved. While in state "Deep Sleep" 510, the FSM may receive signals telling it to start VTCXO operation and/or a reset signal (NRST) or a power on signal (PWRON).

When the FSM receives either a reset request for one or more of the clock domain blocks (ULPD_SYS_NRST=0 (a true value)) or a wakeup request (NWAKEUP_REQ=0 (a true value)), then the FSM may transition to state "Load RF" 515. While in "Load RF" 515, the VCDG 305 may be provided with a number of clock cycles to wait prior to enabling a radio frequency portion of the mobile telephone. This wait, specified with a value "Setup" that specifies a number of clock cycles, can permit clocks sufficient time to stabilize. If the wait (as specified by the value "Setup") is greater than zero, then the FSM may transition to state "Dec RF" 520 wherein it decrements "Setup" once per clock cycle until "Setup" is equal to zero wherein the FSM may then transition to state "Load VTCXO" 525. If "Setup" was equal to zero when the FSM was in state "Load RF" 515, then the FSM may automatically transition to state "Load VTCXO" 525.

In state "Load VTCXO" 525, the FSM may once again be placed into a waiting state while the VTCXO is permitted to become stable. In the "Load VTCXO" state 525, the wait (again specified by a value "Setup") is provided to the VCDG 305 and if "Setup" is greater than zero, the FSM may transition to state "Dec VTCXO" 530 where it will decrement a number of clock cycles equal to "Setup" to permit the VTCXO sufficient time to stabilize. If "Setup" is equal to zero when the FSM is in state "Load VTCXO" 525, the FSM may automatically transition to state "Load Slicer" 535. The "Load Slicer" state 535 is similar to the states "Load RF" 515 and "Load VTCXO" 525, wherein the VCDG 305 is forced to wait a specified number of clock cycles to allow the slicer (not shown) to become stable. Similarly, a state "Load Clk13" 545 can be used to force the VCDG 305 to wait until the Clk13 (a 13 MHz clock) to become stable.

Finally, the FSM can enable Clk13 (note that Clk13 may be particular to this implementation of the VCDG 305 and a clock of a different frequency may be used in other implementations) in state "Enable Clk13" 555. After enabling Clk13, the FSM awakens the VCDG 305 and puts it in operation. As long as the FSM does not receive a deep sleep request (DEEP_SLEEP_REQ=0) and a negative wakeup request remains inactive (NWAKEUP_REQ=0), the FSM keeps the VCDG 305 operating. However, if the FSM should receive a deep sleep request (DEEP_SLEEP_REQ=1) and a negative wakeup request becomes active (NWAKEUP_REQ=1), then the FSM may transition to state "Disable Clk13" 565 wherein the Clk13 can become deactivated. Should the FSM continue to receive an active negative wakeup request (NWAKEUP_REQ=1) while in state "Disable Clk13" 565, the FSM can transition to state "Deep Sleep" 510 wherein it can place the VCDG 305 into a deep sleep mode. If while in state "Disable Clk13" 565 and the FSM receives an inactive negative wakeup request (NWAKEUP_REQ=0), then the FSM can reactivate the Clk13 (state "Enable Clk13" 555) to resume operation of the VCDG 305.

Figure 6:
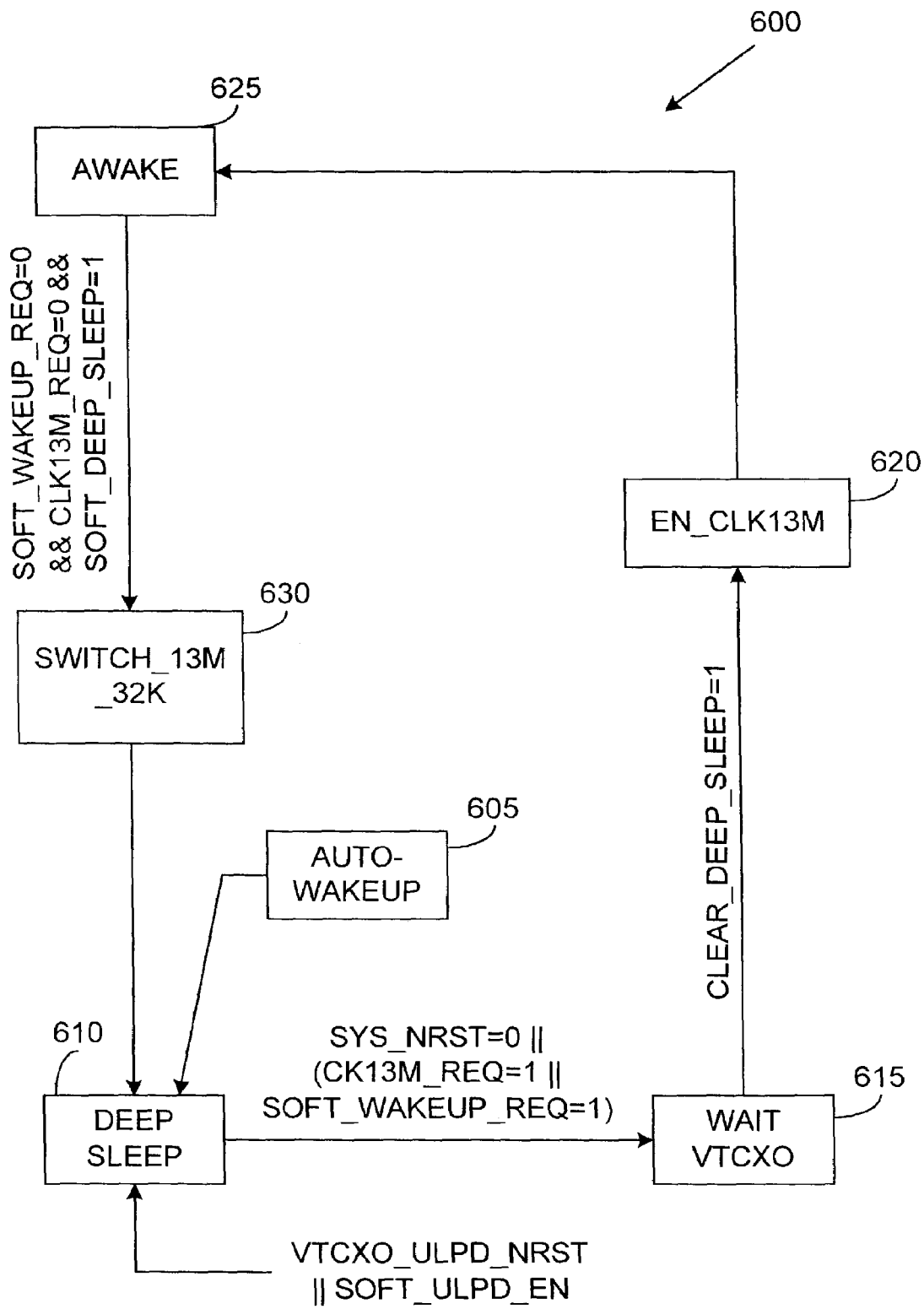
FIG. 6 is a state diagram of a finite state machine used to control the operation of a clock domain block, according to a preferred embodiment of the present invention.

With reference now to FIG. 6, there is shown a diagram illustrating a state diagram 600 of a finite state machine used to control the operation of a clock domain block, according to a preferred embodiment of the present invention. As in the case of the FSM for the VCDG 305 (discussed above), the FSM for a clock domain block begins by evaluating the status of auto wakeup in a state "Auto Wakeup" 605. After evaluating the status of auto wakeup, the FSM can transition to a "Deep Sleep" state 610, wherein the clock domain block may essentially be in a sleep mode. In addition to entering "Deep Sleep" state 610 from the evaluation of auto wakeup, the FSM may enter "Deep Sleep" state 610 if it receives a VTCXO negative reset (VTCXO_UPLD_NRST) or a software enable (SOFT_UPLD_EN).

While in "Deep Sleep" state 610, the FSM may transition to state "Wait VTCXO" 615 if it receives one or more of the following: a negative system reset inactive (SYS_NRST=0) or an active Clk13 request (CLK13M_REQ=1) or an active software wakeup (SOFT_WAKEUP_REQ=1). While in state "Wait VTCXO" 615, the FSM waits until it receives a signal from the VCDG 305 to allow the clock domain block to begin operating. The VCDG 305 asserts an active clear deep sleep signal (CLEAR_DEEP_SLEEP=1) to enable the FSM to transition into a "En Clk13M" state 620, wherein the FSM can enable its reception of the Clk13 from the VCDG 305. The FSM can then transition into an "Awake" state 625, where it can generate a clock as per its configuration.

When in the "Awake" state 625, the FSM can be placed into a deep sleep mode if it receives an inactive soft wakeup signal (SOFT_WAKEUP_REQ=0) and an inactive Clk13 signal (CLK13M_REQ=0) and an active deep sleep signal (SOFT_DEEP_SLEEP=1) signal from the VCDG 305. With the reception of these three signals, the FSM can transition to a "Switch 13M 32K" state 630 wherein the FSM can switch from the 13 MHz clock to a lower frequency clock (in this case a 32 KHz clock, however, this particular frequency is implementation dependent). After switching to the lower frequency clock, the FSM may enter the "Deep Sleep" state 610 where it shuts down, waiting to be reawaken.

Figure 7:
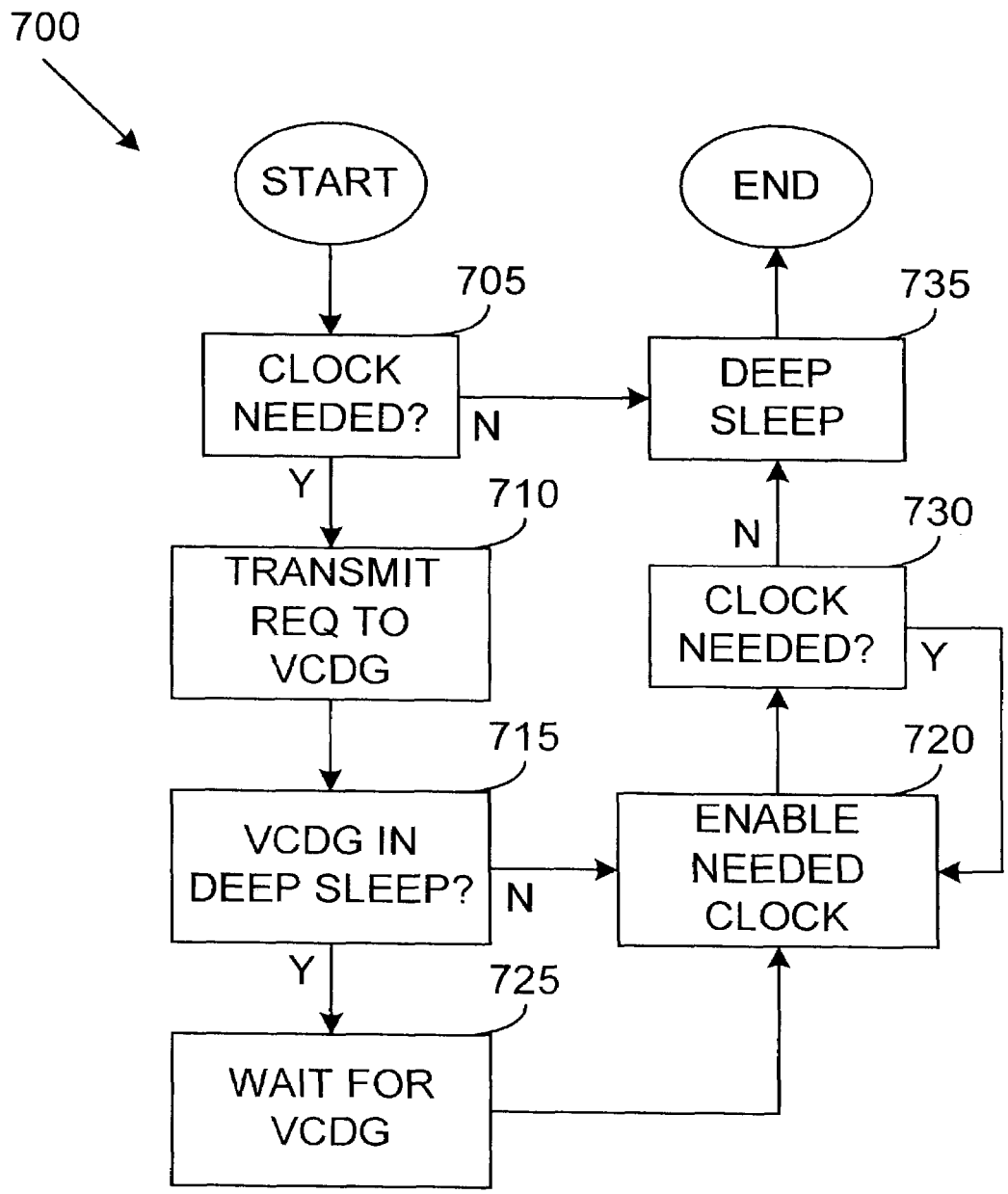
FIG. 7 is a flow diagram illustrating the operation of a clock domain block and its interactions with a VCDG.

With reference now to FIG. 7, there is shown a flow diagram 700 illustrating the operation of a clock domain block and its interactions with a VCDG, according to a preferred embodiment of the present invention. The operation of the clock domain block may begin when it first determines that there is a need for a clock of the type that the clock domain block has been configured to provide (block 705), for example, a clock (or set of clocks) required for GSM operation. If there is no determined need for a clock, then the clock domain block may be able to remain in sleep mode (block 735). With the need for a clock, the clock domain block can transmit a request to the VCDG to enable the clock domain block to begin generating the needed clock (block 710).

If the VCDG was not in a sleep mode (block 715) when the request was received, the VCDG can enable the clock domain block (block 720) to begin generating the needed clock. If the VCDG was in a sleep mode when the request was received, the clock domain block may need to wait for the VCDG to wakeup (block 725) and once the VCDG wakes up, the VCDG can enable to clock domain block (block 720) to begin generating the needed clock. Once the VCDG has enabled the clock domain block to generate the needed clock, the clock domain block can make use of its configuration to generate the needed clock. Hence, through different configurations, the same design for a clock domain block can be used to generate a wide variety of different clocks.

The clock domain block may continue generating the clock until it determines that there is no longer a need for the clock (block 730). When there is no longer a need for the clock that the clock domain block is generating, then the clock domain block can place itself into a sleep mode (block 735) and send a signal to the VCDG to help put the VCDG into a sleep mode if the VCDG is not busy with other clock domain blocks.

Figure 8:
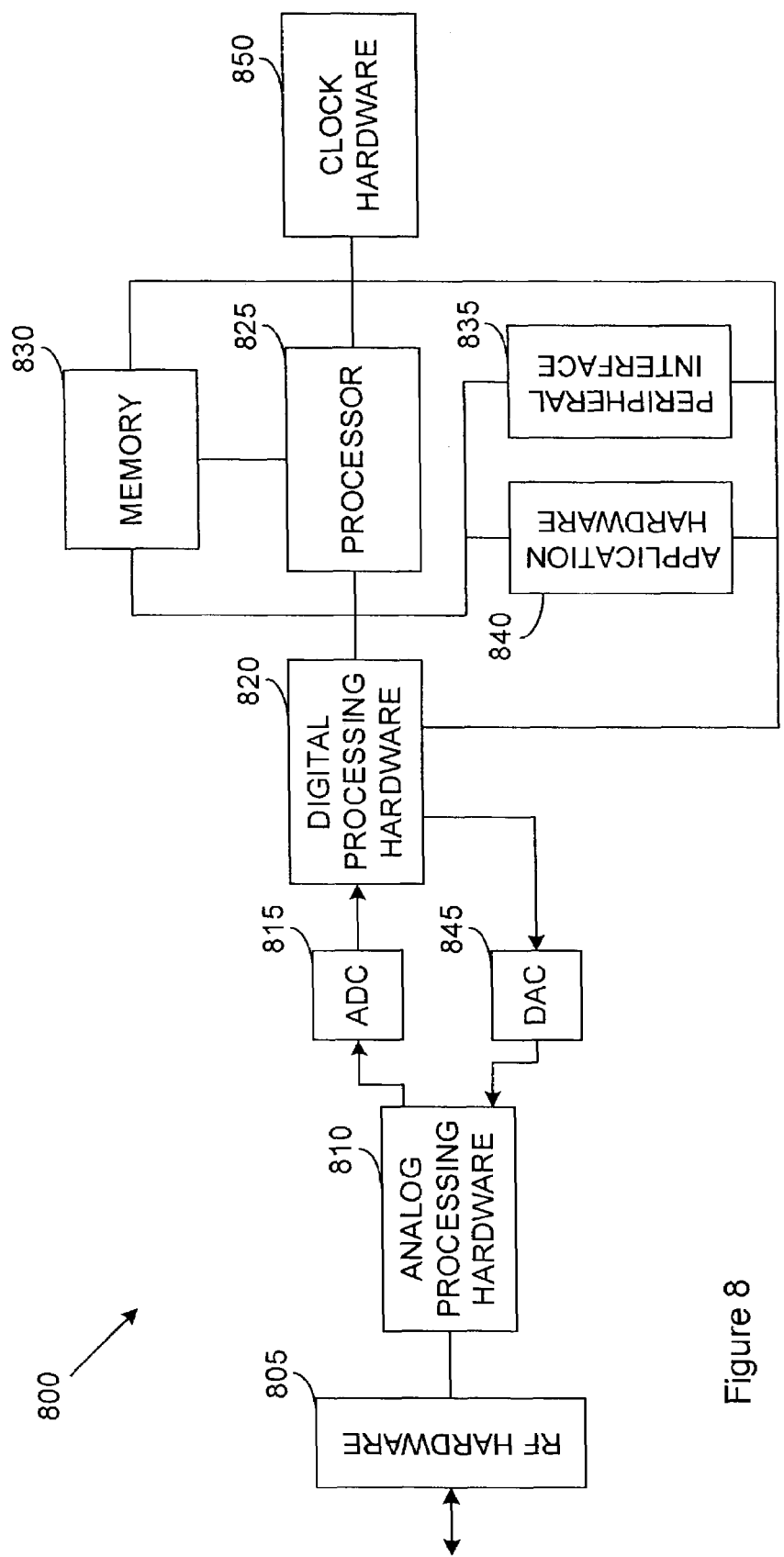
FIG. 8 is a diagram of a mobile telephone with clock generating circuitry, according to a preferred embodiment of the present invention.

With reference now to FIG. 8, there is shown a diagram illustrating a high level view of a SoC implementation of a wireless telephone 800, according to a preferred embodiment of the present invention. The wireless telephone 800, as implemented on a single integrated circuit, may include a radio frequency (RF) hardware 805 which may be responsible for receiving and transmitting information over-the-air. The RF hardware 805 may be coupled to analog processing hardware 810. The analog processing hardware 810 can be used to filter, amplify, flatten, gain control, and so forth the signals received by the RF hardware 805 to make the signals ready for processing by circuitry in the remainder of the wireless telephone 800. The analog processing hardware 810 may also be used for transmission of signals as well. When so used, the analog processing hardware 810 may be used to provide amplification and filtering of the signals to be transmitted.

An analog-to-digital converter (ADC) 815 can be used to convert output from the analog processing hardware 810 into a digital symbol stream which can be processed by digital processing hardware 820. The digital processing hardware 820 may be perform operations such as error detecting and correcting, decoding, deinterleaving, despreading, digital filtering, and so forth on the digital symbol stream provided by the ADC 815. When used in transmission operations, the digital processing hardware 820 may be used perform operations such as encode, spread, interleave, and so forth on a digital data stream provided by a processor 825.

The processor 825 (or a digital signal processor (DSP) or a controller) operates as a central brain of the wireless telephone 800. The processor 825 may be used to perform additional operations on the data received or to be transmitted. The processor 825 may also be used to control the operation of additional hardware present in the wireless telephone 800 to provide additional functionality. Attached to the processor 825 is a memory 830 that can be used for storage of data, programs, intermediate processing results, and so forth.

Application hardware 840, used to provide additional functionality to the wireless telephone 800, such as multi-mode operation, multi-media functionality, general purpose computing, additional connectivity (such as USB, Firewire, and so on), and so forth may be coupled to the processor 825 and memory 830. Finally, if the wireless telephone 800 has the capability to accept peripherals such as displays, audio/video output/input, information/data input, and others, a peripheral interface 835 may be present to provide necessary protocol and data compatibility conversions.

A clock hardware unit 850, such as one described above, may be used to provide the different clocks needed by the different hardware units. For example, the processor 825 may require a clock of different frequency and duty cycle from the application hardware 840 supporting the different applications and from the hardware in the peripheral interface 835.

Note that FIG. 8 illustrates the use of the present invention to provide a flexible and scalable clock management system for a mobile telephone that has been integrated into an integrated circuit. However, the present invention may be used to provide a flexible and scalable clock management system for a wide variety of systems that have a need for multiple clocks of different frequencies and formats. For example, a computer, a personal digital assistant, a multi-media playback device, telemetry equipment, and so forth.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A mobile telephone with functionality implemented on a single integrated circuit comprising:

an analog processing hardware block coupled to a radio frequency (RF) transceiver, the analog processing hardware block containing circuitry to amplify, filter, and gain control a signal provided by the RF transceiver;

a digital processing hardware block coupled to the analog processing hardware block, the digital processing hardware block containing circuitry to error detect and correct, filter, and decode a signal provided by the analog processing hardware block;

a processor coupled to the digital processing hardware block, the processor to execute programs to manipulate data provided by the digital processing hardware block;

an applications hardware unit coupled to the processor, the applications hardware unit containing circuitry to support different communications protocols supported by the mobile telephone;

a peripherals interface coupled to the processor, the peripherals interface containing circuitry to translate signals and protocols to allow the mobile telephone to communicate with attached devices; and a clock hardware unit coupled to the processor, applications hardware unit, and peripherals interface, the clock hardware unit to provide clocks of differing frequencies and formats, wherein the clock hardware unit comprises an oscillator controller coupled to an oscillator, the oscillator containing circuitry to enable the operation of a plurality of clock domain blocks coupled to the oscillator controller and to distribute a clock signal generated by the oscillator, and a clock domain controller associated with each clock domain block, wherein each clock domain controller contains circuitry to monitor for a clock request and in response to the clock request to generate a clock signal of a type as specified in a configuration of the clock domain controller based on a connectivity application and on a clock signal provided by the oscillator controller.

2. The mobile telephone of claim 1, wherein the applications hardware unit comprises a Universal Mobile Telephony System (UMTS) unit, a Global System for Mobile Telephony (GSM) unit, a Universal Serial Bus (USB) unit; and wherein the clock hardware unit contains clock domain blocks for each listed unit.

3. The mobile telephone of claim 2, wherein the clock hardware unit contains a clock domain block that is customizable after manufacture to produce a desired clock signal.

4. The mobile telephone of claim 2, wherein the applications hardware unit further comprises a CDMA2000 (Wideband Code-Division Multiple Access) unit.

5. The mobile telephone of claim 1, wherein the mobile telephone is operable in a Universal Mobile Telephony System (UMTS) compliant wireless network and a Global System for Mobile Telephony (GSM) compliant wireless network.

* * * * *